No. 684,683. Patented Oct. 15, 1901.
C. FOX.
AXLE JOURNAL.
(Application filed Jan. 22, 1901.)
(No Model.)
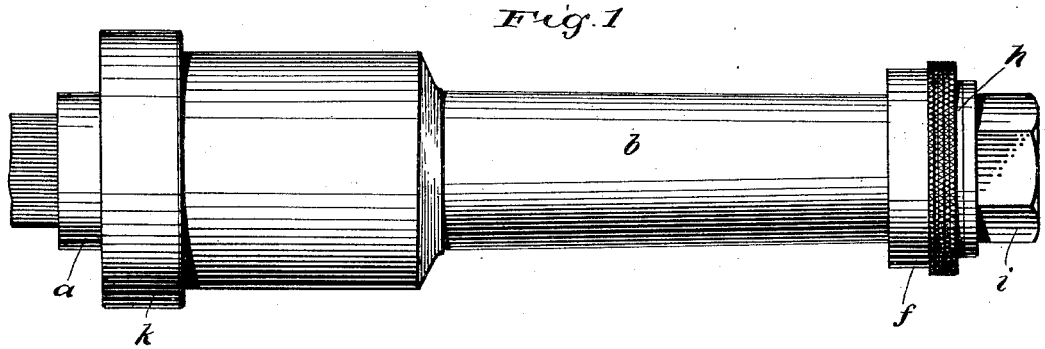
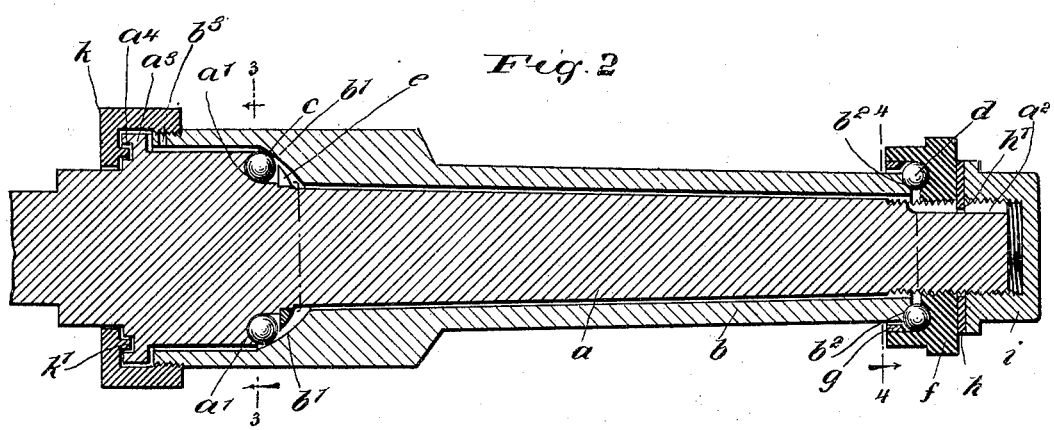
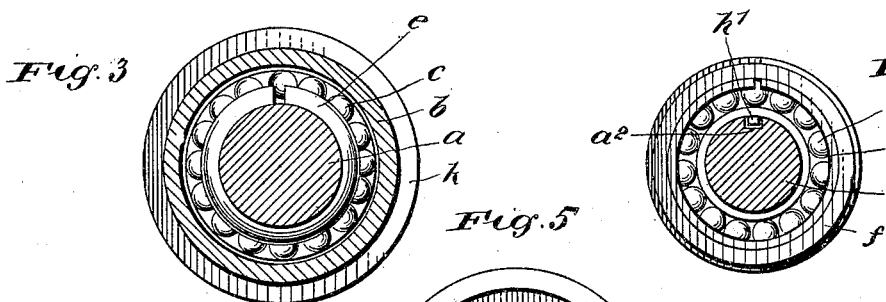
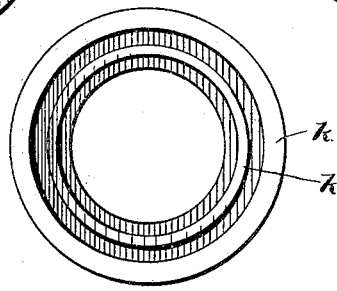
WITNESSES:
INVENTOR
Christian Fox
BY
ATTORNEYS

UNITED STATES PATENT OFFICE.

CHRISTIAN FOX, OF GAP, PENNSYLVANIA, ASSIGNOR OF ONE-HALF TO GIDEON FISHER AND ALBERT G. BOMBERGER, OF SAME PLACE.

AXLE-JOURNAL.

SPECIFICATION forming part of Letters Patent No. 684,683, dated October 15, 1901.

Application filed January 22, 1901. Serial No. 44,290. (No model.)

*To all whom it may concern:*

Be it known that I, CHRISTIAN FOX, a citizen of the United States, and a resident of Gap, in the county of Lancaster and State of Pennsylvania, have invented new and useful Improvements in Axle-Journals, of which the following is a full, clear, and exact description.

This invention relates to means for mounting wheels upon axle-journals so that the movement of the wheels will be attended by the least possible friction and so also that should the nut become disengaged from the journal the wheel will still be held in place.

The invention further embodies peculiarities of construction rendering the bearing entirely dust-proof and permitting it to be oiled without removing the wheel.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side view of the invention. Fig. 2 is a longitudinal section thereof. Fig. 3 is a section on the line 3 3 of Fig. 2. Fig. 4 is a section on the line 4 4 of Fig. 2, and Fig. 5 is an end elevation of the annulus at the inner end of the hub.

$a$ represents the axle spindle or journal, and $b$ represents the box, which is adapted to be fixedly engaged in the hub of the wheel, as usual. The box $b$ is mounted on the spindle through the medium of bearing-balls $c$ and $d$, so that these balls sustain the box out of contact with the spindle and permit the rotation of the box with very little friction incident thereto.

The parts $a$ and $b$ are formed with opposing surfaces $a'$ and $b'$, between which the balls $c$ bear, and these balls are held in place on the spindle by a ring $e$, which is sprung around the spindle in the position shown and which may be removed to permit the emplacement and displacement of the balls when desired. The outer end of the box $b$ is provided with a concave surface $b^2$, forming a ball-race, in which are engaged the balls $d$. These balls are held in a cup $f$, which is threaded on the end of the spindle and provided with a ring $g$, sprung into position and serving to hold the balls $d$ in place and also to exclude dust from the bearing. The balls $d$ travel between the race $b^2$ and a correspondingly-arranged surface on the cup $f$, forming a race thereon.

The cup $f$ is threaded on the end of the spindle, as shown, and against the outer face of the cup bears a washer $h$, having a tongue $h'$, which fits in a longitudinally-formed groove $a^2$ in the end of the spindle $a$. This prevents the washer from turning on the spindle. The washer is not threaded, but simply fits loosely over the spindle end. A cap-nut $i$ screws on the end of the spindle and bears against the washer $h$, forcing it firmly against the cup $f$. It will be observed that since the washer $h$ is not permitted to turn the turning movement of the cap-nut $i$ will not be imparted to the cup $f$, and consequently when the cup is properly adjusted on the spindle and the washer $h$ in place it will be impossible to disturb the adjustment of the cup $f$ by turning the nut $i$. This enables the nut to be screwed up in the tightest possible manner against the cap without disturbing the nicety of adjustment of the bearing-balls.

At the inner end of the spindle $a$ an annular rib $a^3$ is formed, and the inner side of this rib is formed with an annular groove $a^4$. Over the rib $a^3$ fits an annulus $k$, which has an annular tongue $k'$ fitting loosely in the groove $a^4$, and the annulus is screwed firmly over the inner end of the box $b$. The annulus $k$ therefore is carried by the box and turns with the same, the interengaging parts $k'$ and $a^4$ forming an absolutely dust-proof connection. Formed in the box $b$ is an oil-opening $b^3$, which is covered by the annulus $k$ when the latter is in place. By screwing the annulus $k$ partly back toward the disengaged position of the annulus the oil-opening $b^3$ will be exposed and the bearing may be oiled without removing the wheel from the spindle.

Having thus described my invention, I claim as new and desire to secure by Letters Patent—

1. The combination of an axle-spindle having an annular rib at its inner portion, a box mounted thereon, a bearing-cup threaded on the end of the spindle and forming a bearing for the end of the box, balls bearing between the box and cups, a washer fitted on the spindle and engaging the outer face of the cup, the washer being incapable of turning on the spindle, a nut screwed on the end of the spindle and bearing against the washer to hold the bearing-cup in place, and an annulus secured to the inner end of the box and engaging over the rib of the spindle.

2. The combination of an axle-spindle having an annular rib at its inner end, the rib being provided at its inner face with an annular groove, a box mounted to turn on the spindle, bearing devices arranged at the outer end of the box, and an annulus carried by the inner end of the box and embracing the rib of the spindle, the annulus being angular in cross-sectional form and having an annular rib or tongue running loosely in the groove of the rib on the spindle.

In testimony whereof I have signed my name to this specification in the presence of two subscribing witnesses.

CHRISTIAN FOX.

Witnesses:
 SAUL A. BOOTH,
 GEORGE ROBINSON.